United States Patent [19]

Lyon

[11] Patent Number: 4,637,426

[45] Date of Patent: Jan. 20, 1987

[54] FILL CONTROL VALVE

[76] Inventor: Ronald J. Lyon, 12029 Smallwood, Downey, Calif. 90241

[21] Appl. No.: 796,999

[22] Filed: Nov. 12, 1985

[51] Int. Cl.⁴ .................... F16K 31/22; F16K 15/04
[52] U.S. Cl. .................... 137/433; 137/449; 137/533.11; 137/599; 141/199; 141/286; 141/303; 141/367
[58] Field of Search ............. 137/202, 430, 433, 449, 137/599, 533.11; 141/46, 199, 286, 303, 367, 368

[56] References Cited

U.S. PATENT DOCUMENTS

| | | |
|---|---|---|
| 2,336,430 | 12/1943 | Wery ................................. 141/286 |
| 2,767,551 | 10/1956 | Clute ................................. 137/433 |
| 3,139,123 | 6/1964 | Lisciani ............................ 141/286 |
| 3,610,275 | 10/1971 | Determan et al. ............... 137/430 |
| 4,104,004 | 8/1978 | Graef ................................ 137/202 |
| 4,363,339 | 12/1982 | Puskarz ............................ 141/303 |
| 4,462,417 | 7/1984 | Trinkwalder, Jr. .............. 137/449 |

*Primary Examiner*—George L. Walton
*Attorney, Agent, or Firm*—G. Donald Weber, Jr.

[57] ABSTRACT

A valve which is used to control the gravity-feed filling of containers by selectively permitting certain fluids to escape from the container while the container is being filled thereby controlling the amount of material which is admitted to the container.

12 Claims, 4 Drawing Figures

FILL CONTROL VALVE

BACKGROUND

1. Field of the Invention

This invention is directed to fill control valves in general, and to a fill control valve which incorporates a check valve operation which is used to control a container filling operation, in particular.

2. Prior art

There are many types of fill valves, control valves and check valves known in the art. These valves are frequently used in various techniques employed in filling of containers or utensils which receive some type of liquid material. One notable usage is in the filling of containers with soft drinks. In the past, bottles have been used and particular kinds of valves have been required. In recent history, many soft drinks are now distributed in cans made of tin or aluminum, or the like. These cans are filled on large filling machines which can fill many cans concurrently while moving the cans in a substantially continuous path around or through the machine. Typically, the machine includes a large reservoir of the liquid to be placed in the containers and a large plurality of filling valves. In some types of known filling machines, it is typical to provide in the neighborhood of 40 to 130 filling valves which can fill up to 1850 cans per minute. Of course, the number of cans to be filled is a function of numerous parameters including the number of filling valves, the temperature fo the liquid, the temperature of the environment wherein the filling takes place, and the type of liquid (for example whether it is carbonated or not).

Another problem which is encountered in filling soft drink containers is the fact that the carbonation in the liquid frequently causes bubbling or frothing of the liquid if it is fed into the can too rapidly. A "sniffer" line is, typically, used to remove this excess froth or foam. If the froth is of a substantial nature, it will sometimes, activate the check valve apparatus so that a "short fill" in the can or container occurs. Conversely, if the fill rate is slow, the entire operation is slowed. Therefore, this is not a really viable alternative process to avoid the problems associated with frothing of liquid.

Still another problem encountered in can filling machines is that the fluid (typically gaseous) in the container must be displaced and removed. A fill control valve is disposed on the filling machine apparatus to be adjacent the top of the container so that the displaced fluid (gas) can pass therethrough and escape. However, the fill control valve must also be adapted to close when the contents (liquid) of the container reaches a prescribed level. Otherwise, product can be lost (through a late closing valve) or a short-fill can be produced (by an early closing valve). Therefore, the fill control valve can become a very important component in a filling machine. This fill control valve can have a very dramatic economic impact on the operation of the filling machine apparatus.

Inasmuch as the soft drink bottling business is a substantial industry, there are, obviously, many filling machines which are available on the market. These machines, of course, use valves to control the filling of the containers. The valves are, in many cases, operable and effective to the extent that they are available. However, the known valves suffer from difficulties in "short fills" as a result of excess gas or "double dribbles" caused by improper feeding techniques. Therefore, it is necessary and desirable to improve the operation and throughput of the system. Consequently, improved fill control valves are highly desirable.

PRIOR ART STATEMENT

In conducting a patententability search, applicant has uncovered a number of patents which are listed herewith in numerical order. No particular significance is attached to the placement of the patents in this listing.

U.S. Pat. No. 140,462; Bristol; WATER-FEED FOR BOILERS. This patent is directed to a float valve which controls the flow of water into a water boiler.

U.S. Pat. No. 1,519,832; Griffin; VALVE. This patent is directed to a float valve which has a novel valve seat mounting.

U.S. Pat. No. 1,539,180; Gore; VALVE. This patent is directed to a shut-off valve for stopping the flow of liquid into a tank which has reached a specific level.

U.S. Pat. No. 1,591,799; Tinapp; WATER COOLER. This patent is directed to a float valve which is used with a bottled water cooler apparatus.

U.S. Pat. No. 1,664,266; Del Rio; FUNNEL. This patent is directed to a funnel with a floatable valve head for insertion into the neck of a bottle.

U.S. Pat. No. 2,375,406; Drown; NON-OVERFILL DEVICE. This patent is directed to a ball valve which is used in a storage battery to control the amount of electrolytes therein.

U.S. Pat. No. 2,587,388; Ryder, Jr.; DISPENSING CAP. This patent is directed to a dispensing device used in the tank of a flush toilet and includes a valve stem for controlling the dispensing operation.

U.S. Pat. No. 2,620,097; Titmas; PLASTIC DISPENSER FOR DISINFECTANTS AND THE LIKE. This patent is directed to a device for dispensing materials into the flush tank of a toilet using a downwardly projecting tubular member by which measuring or metering of the dispensing operation is effected.

U.S. Pat. No. 2,767,552; Clute; FILL VALVE FOR LIQUIFIED PETROLEUM GAS TANKS. This patent is directed to a float control valve which includes a vertically elongated unit which has a diameter not greater than and preferably smaller than the internal diameter of a threaded opening in the tank so that different liquid levels can be obtained in the tank.

U.S. Pat. No. 2,796,883; Thompson; AUTOMATIC TANK SHUT-OFF. This patent is directed to a shut-off valve for an outlet line in a tank and includes a cage apparatus inside the tank to prevent sediment from entering the outlet tank.

U.S. Pat. No. 2,990,845; Sklash et al; FLOOD REGULATOR. This patent is directed to a T-shaped pipe fitting with a valve seat on the interior thereof which is used to prevent backflow of sewage into a basement or the like.

U.S. Pat. No. 3,528,451; Hansen; LIQUID LEVEL REGULATING DEVICE. This patent is directed to a valve which includes a hollow, air-filled ball positioned within the housing to sense the level of the liquid and control the rate of flow of liquid through an orifice.

SUMMARY OF THE INSTANT INVENTION

This invention is directed to a fill control valve which is substantially cylindrical in configuration. An outlet port is threaded for attachment to a filling machine apparatus. The valve is a hollow core device which includes openings in the sides and the bottom thereof (to form a cage) so that fluid can pass therethrough out of a container during a filling operation. A ball mounted within the cage of the valve is adapted to rise and selectively close the valve when the level of the material within the container reaches a prescribed limit.

An upper and a lower O-ring are provided adjacent the upper and lower ends of the cage wherein the ball is mounted so as to provide a reliable seal between the ball and the valve. A divider pin is also disposed through the valve and extends diametrically across the bore therein. The divider pin is placed between the outlet port and the upper O-ring so as to not interfere with the operation of the ball. Rather, the divider pin provides a dividing action upon any gas or fluid which may be inadvertently passed into the valve during a fill operation so as to avoid short fills caused by excessive foam or froth during the filling operation. Also, double dribbles are avoided by dividing the flow of extraneous back pressure gas.

DESCRIPTION OF A PREFERRED EMBODIMENT

Figure 1:
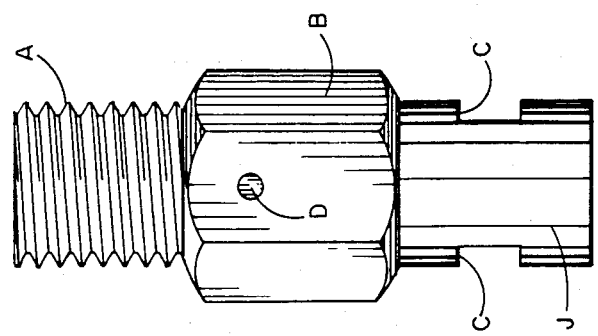
FIG. 1 is an external view of one embodiment of the valve of the instant invention.

Referring now to FIG. 1, there is shown an external view of a preferred embodiment of the control valve of the instant invention. The valve comprises an outlet portion A, a body portion B and a cage portion J. The inlet portion A is threaded externally so as to be readily engagable with the filling machine apparatus which does not form a part of this invention. The excess froth and the displaced fluid is permitted to be removed from the container through the outlet port during the filling operation as described hereinafter.

The body B is shown to be substantially hexagonal in configuration so that it can be readily installed by means of a wrench or the like during the mounting thereof to the filling machine apparatus. Other configurations are possible, of course.

The cage portion J includes at least one and, preferably a plurality of apertures C through the side (or sides) thereof. Also, in a preferred embodiment, the bottom end of the cage J is open. Through the apertures C, the interior of the container to be filled (see FIG. 3) communicates to the interior of the valve. The interior dimension (diameter) of cage J is substantially the same as body B. However, cage J is, typically, formed as a cylindrical portion for convenience.

A divider pin D is passed through the body B in a radial fashion as shown.

Figure 2:
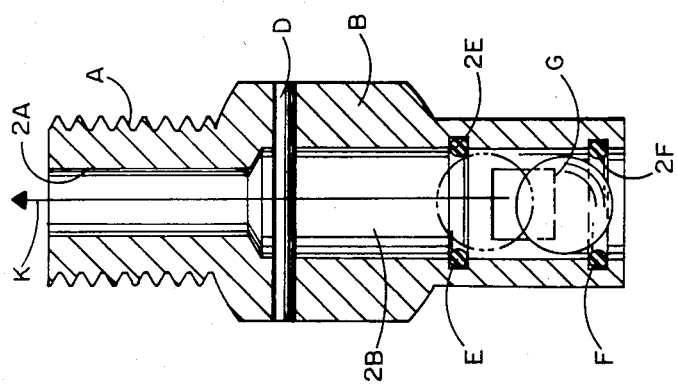
FIG. 2 is one cross-sectional view of one embodiment of the valve of the instant invention.

Referring now to FIG. 2, there is shown a cross-sectional view of the valve shown in FIG. 1, except the valve is rotated approximately 90° in order to more clearly show the pin D. Again, the outlet portion A is shown threaded and includes a bore 2A therethrough. In the preferred embodiment, the bore 2A is a smooth bore and is not threaded. Of course, it is possible that in some instances, the threaded arrangement would be reversed and outlet A will be internally threaded for mounting onto an appropriate nipple on the filling machine. In the latter case, outlet port A would probably have a larger diameter (on the order of the dimension of body B).

The body B is, also, substantially hollow and includes therein a cavity 2B through which fluid can pass. As shown in FIG. 2, the diameter of cavity 2B is substantially the same size as the diameter of cage J. This permits the liquid to be passed readily through the body of the fill control valve and out of the container being filled.

At the lower end of body B (or at the upper end of cage J) there is provided a groove E into which O-ring 2E can be inserted. This groove is disposed above the apertures C in the cage J. The groove is arranged, as noted, to receive an O-ring 2E which operates as an upper valve seat in the valve apparatus. In the event that the groove E is disposed in the lower portion of the body B, the O-ring which is placed in groove E must have a sufficiently large outer diameter so as to be securely mounted in the groove E and of sufficiently small internal diameter so as to mate with ball G (described hereinafter) to affect a proper valve seat. Ball G is sized so as to move freely in the bore of cage J which is longer than the diameter of ball G. Also, ball G engages and seats with O-ring 2E to form a tight-fitting seal.

At the lower end of the cage J is another groove F which is arranged to receive an O-ring 2F therein. The O-ring 2F provides a means for retaining the ball G in the cage J. As noted, the ball G is disposed movably within the cage C. In particular, the ball is free to move between the O-rings 2E and 2F which are mounted in the slots E and F, respectively. When the ball is engaged with the O-ring 2F in groove F, fluid is able to flow out of the container, through the valve following the path K (represented by an arrow) through apertures C, through the body cavity 2B and through the oulet port A. This fluid flow releases internal pressure and permits a container to be readily filled. When the incoming liquid has reached an appropriate level, the liquid lifts ball G off O-ring 2F, above apertures C and forces the ball G upwardly into engagement with the O-ring 2E in groove E. At this point, the valve is, effectively, closed. No fluid flows out of the container through the valve because the ball G and the O-ring 2E in groove E have formed a sufficiently compact seal.

The ball G is, typically, fabricated of a polypropylene material of FDA quality so that it can be used in a soft drink filling machine apparatus. The O-ring 2E which is used in groove E is, typically, a neoprene O-ring also of FDA quality. The O-ring 2F which is deposited in groove F is typically a TFE O-ring of FDA quality.

The divider pin D is shown extending across the entire the width of body B. It is, preferably, smoothly mounted on the exterior so as to avoid any unnecessary interaction with exterior components. Also, as shown, pin D is a rod or the like. However, it is understood that pin D can have any suitable shape desired. For example, it can include a flat side or the like so that it does not rotate in the fill valve. However, by judicious selection of the materials and the tolerances, the pin can be properly mounted. It has been determined that in this embodiment, a simple rod is the easiest and least expensive arrangement.

Figure 3:
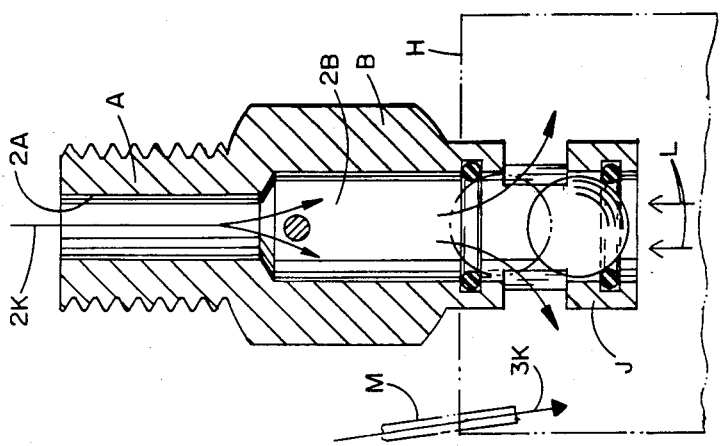
FIG. 3 is another cross-sectional view of the valve, rotated 90° from the showing in FIG. 2.

Referring now to FIG. 3, there is shown another cross-sectional view of the valve, rotated approximately 90° relative to FIG. 2. In this embodiment, the inlet port A, the body B and the cage J are similar to those shown in FIG. 2. In addition, a container H to be filled with liquid is shown schematically. In FIG. 3, the liquid flow is represented by arrow 3K. The liquid (3K) passes through an inlet tube M which is shown schematically.

The inlet line M is arranged so that the liquid 3K tends to run down the inside wall of the container. This operation reduces splash and turbulence. As a consequence, a minimum amount of froth and foam are produced while placing a carbonated beverage in the container. Thus, a true fill measure can be effected with the fill control valve. This method of entering the liquid into the container is conventional in the art.

However, in other regards the valve of this invention operates in the same fashion noted above. That is, the liquid enters as shown by line 3K and is dispensed into container H. The O-ring 2F in groove F retains the ball G within the valve. When the liquid level rises as suggested by the arrows L, the ball G is lifted and floats thereon. When the liquid reaches the appropriate level, the ball G is seated against the O-ring 2E in groove E and is operative to effect a seal of the valve. Thus, fluid (gas or liquid) cannot escape via port A and, due to the operation of the filling machine, no further liquid will be supplied. That is, the respective pressures in the filling machine are arranged to respond to the closing of the valve by ball G so as to terminate the filling of container H.

As described supra, the fill control valve is used to permit gases to escape from the interior of a container and to affect filling machine pressures to terminate the fill operation. However, a problem sometimes occurs during the filling operation wherein an unexpected influx of gas or liquid from the outlet area is experienced through the outlet port A. That is, due to a spurious pressure condition or an unusual liquid flow, a reverse flow passes through bore 2A into the interior of the container H. In the prior art control valves, this reverse flow has the effect of bouncing the ball G against O-ring 2F and back into contact with O-ring 2E. Conversely, if the influx is of gas alone, the gas can create a pressure within the container H so as to push the ball G against O-ring 2E. In either event, the engagement of ball G with O-ring 2E causes the termination of the fill operation whereupon container H remains nearly empty and becomes and undesireable "short fill". However, as seen in FIGS. 2 and 3, the divider pin D is mounted across the body B and causes the reverse fluid flow suggested by arrow 2K to be diverted, dispersed or otherwise broken up in terms of flow. Thus, a certain amount of turbulence is created in cavity 2B. Because of the diversion and the turbulence which occurs, the reverse fluid flow does not cause ball G to bounce or rebound into contact with O-ring 2E. With O-ring 2E and ball G disengaged, the operation of the filling machine apparatus continues in the normal fashion.

With the apparatus shown and described, a closer tolerance can be effected in the filling apparatus. In addition, there are virtually no problems in the seating of the ball G on the O-ring 2E. Moreover, the undesired gas short-fill problem produced by spurious gas fill or "double dribble" is overcome because of the deflector pin.

Figure 4:
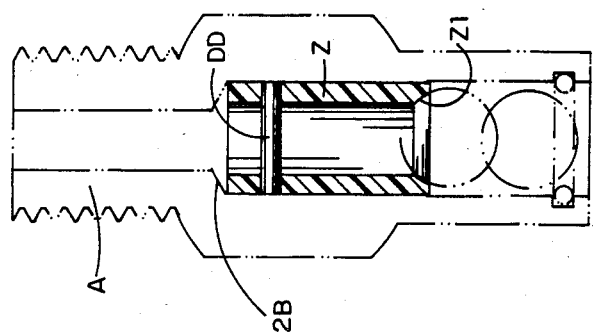
FIG. 4 is a partially broken away view of another embodiment of the valve of the instant invention.

Referring now to FIG. 4, there is shown an alternative embodiment of the instant invention. In this embodiment, the divider pin DD (which is substantially identical to divider pin D, especially in function) is formed as a part of an insert which is shown in cross-section. In a typical application, the insert Z, with pin DD, is formed of an approved plastic by any suitable process, such as molding. The insert Z is then placed, for example by force fit, within the interior of body cavity 2B (see FIG. 2). This procedure has the manufacturing advantage of eliminating the mounting of divider pin D into the body B as shown in FIGS. 1-3.

In addition, it is possible to properly contour the lower edge Z1 of the insert Z to form a seat for the ball G. In this arrangement, the groove E for O-ring 2E can be eliminated.

Thus, there is shown and described a preferred embodiment of a fill valve. This invention incorporates numerous inventive concepts as described above. Also, the apparatus is formed of specific materials as described. However, other materials can be utilized if so desired. For example, the body can be formed of stainless steel or some different kind of material, the O-rings can be formed of different materials and so forth. Likewise, the body need not be hexagonal shape. However, this shape is found to be advantageous.

It is recognized that those skilled in the art may conceive of modifications and changes which can be made to the invention as described. However, any such modifications and changes which fall within the purview of this description are intended to be included therein, as well. The description is intended to be illustrative only and is not intended to limitative. Rather, the scope of the invention is limited only by the claims appended hereto.

I claim:

1. A valve comprising,
an elongated, substantially cylindrical body having a bore passing axially therethrough,
a first valve seat formed within said bore adjacent a first end of said body,
a second valve seat within said bore and spaced from said first valve seat,
at least one aperture in and through the side of said body and communicating with said bore intermediate said first and second valve seats,
a movable valve closing device which is selectively movable from said first valve seat to said second valve seat and vice versa, and
diverter means mounted in said bore between said second valve seat and a second end of said body for diverting a fluid flow therein, and a portion of said valve closing device extending into said bore and adjacent said at least one aperture when said valve closing device is seated on said valve seat for continuously and further diverting the fluid flow through the side of said body.

2. The valve recited in claim 1 wherein,
said diverter means comprises a rod shaped device which is mounted radially in said body across to said bore.

3. The valve recited in claim 1 wherein,
said diverter means includes a mounting member which fits snugly within said bore in said body member.

4. The valve recited in claim 1 wherein,
said body is threaded at one end thereof.

5. The valve recited in claim 1 wherein,
said movable valve closing device comprises a spherical member.

6. The valve recited in claim 1 wherein,
said first and second valve seats comprise O-rings retained in grooves formed in the internal surface of said bore in said body.

7. A valve for controlling the filling of a container with a liquid, comprising
   a body portion,
   an outlet portion at one end of said body portion,
   a cage portion at the opposite end of said body portion,
   a bore which passes axially through each of said body portions, said outlet portion and said cage portion.
   at least one aperture in the said of said cage portion which communicates with the bore therethrough,
   ball means supported in said cage portion,
   sealing means provided adjacent the juncture of said cage portion and said body portion,
   retaining means provided at the unattached end of said cage portion to retain said ball means within said cage portion,
   said sealing means adapted to receive said ball means for selectively forming a seal to prevent fluid from passing through said bore from said cage portion through said body portion, and
   pin means disposed in said body portion and arranged radially relative to said bore for diverting a liquid flow within said bore, and a portion of said ball means extending into said bore and adjacent said at least one aperture when the ball means is received by said sealing means for continuously and further diverting the liquid flow through the side of said cage portion.

8. The valve receited in claim 7 wherein,
   said sealing means includes an O-ring disposed in an annular groove formed in said bore.

9. The valve recited in claim 7 including,
   hollow cylindrical insert means disposed axially within said bore,
   said cylindrical insert means providing said sealing means at one end thereof and including said pin means adjacent the other end thereof.

10. The valve recited in claim 7 wherein,
    said retaining means includes an O-ring disposed in an annular groove formed in said bore adjacent the unattached end of said cage portion wherein said O-ring can be selectively removed to release said ball means from said cage portion.

11. The valve recited in claim 7 wherein,
    said pin means has a diameter which is less than one-third of the diameter of said bore.

12. The valve receited in claim 4 including,
    a portion of said body intermediate said threaded one end and said aperture which is configured to have a plurality of sides thereon to permit grasping thereof for the mounting of said valve into an associated mechanism.

* * * * *